US009469790B2

(12) United States Patent
Gross et al.

(10) Patent No.: US 9,469,790 B2
(45) Date of Patent: Oct. 18, 2016

(54) ADHESIVE COMPOSITIONS COMPRISING ELECTRICALLY INSULATING-COATED CARBON-BASED PARTICLES AND METHODS FOR THEIR USE AND PREPARATION

(75) Inventors: Adam Franklin Gross, Santa Monica, CA (US); Robert W. Cumberland, Malibu, CA (US); Randall J. Moss, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 787 days.

(21) Appl. No.: 12/569,616

(22) Filed: Sep. 29, 2009

(65) Prior Publication Data

US 2011/0076391 A1     Mar. 31, 2011

(51) Int. Cl.
| C08K 3/00 | (2006.01) |
| B32B 5/16 | (2006.01) |
| C09J 11/04 | (2006.01) |
| C09J 9/00 | (2006.01) |
| C09K 5/14 | (2006.01) |
| C08K 3/04 | (2006.01) |
| C08K 9/02 | (2006.01) |

(52) U.S. Cl.
CPC . *C09J 11/04* (2013.01); *C09J 9/00* (2013.01); *C09K 5/14* (2013.01); *C08K 3/04* (2013.01); *C08K 9/02* (2013.01); *Y10T 428/2991* (2015.01)

(58) Field of Classification Search
CPC ...... C01B 3/00; C01B 3/04; Y10T 428/2991
USPC .................................. 428/403–407
See application file for complete search history.

(56) References Cited

U.S. PATENT DOCUMENTS

| 4,373,006 | A | * | 2/1983 | Galasso et al. ............... 428/368 |
| 4,448,840 | A | * | 5/1984 | Matsushita ..................... 442/72 |
| 5,545,473 | A | * | 8/1996 | Ameen et al. ................ 428/212 |
| 5,641,466 | A | | 6/1997 | Ebbesen et al. |
| 5,698,175 | A | | 12/1997 | Hiura et al. |
| 5,965,064 | A | * | 10/1999 | Yamada et al. ................ 252/512 |
| 6,350,488 | B1 | | 2/2002 | Lee et al. |
| 6,387,531 | B1 | * | 5/2002 | Bi et al. ......................... 428/570 |
| 6,485,831 | B1 | * | 11/2002 | Fukushima et al. ........... 428/403 |
| 6,689,186 | B1 | | 2/2004 | Hampden-Smith et al. |
| 6,705,388 | B1 | * | 3/2004 | Sorgo ............................. 165/80.3 |
| 6,794,035 | B2 | * | 9/2004 | Tobita et al. ................. 428/402 |
| 6,822,018 | B2 | | 11/2004 | Chaudhuri et al. |
| 7,253,442 | B2 | | 8/2007 | Huang et al. |

(Continued)

FOREIGN PATENT DOCUMENTS

| EP | 1186689 A1 | 3/2002 |
| WO | 2007036805 A2 | 4/2007 |
| WO | 2009035439 A1 | 3/2009 |

OTHER PUBLICATIONS

Hackl, G. et al.; Coating of Carbon Short Fibers with Thin Ceramic Layers by Chemical Vapor Deposition; Thin Solid Films 513 (2006); pp. 217-222; www.sciencedirect.com; Elsevier 2006.

(Continued)

*Primary Examiner* — Holly Le
(74) *Attorney, Agent, or Firm* — Armstrong Teasdale LLP

(57) ABSTRACT

Adhesive compositions that contain thermally conductive carbon-based materials that are also electrically insulated; methods for using such adhesive compositions and methods for their preparation.

12 Claims, 4 Drawing Sheets

(56) References Cited

U.S. PATENT DOCUMENTS

| | | | |
|---|---|---|---|
| 7,264,869 B2* | 9/2007 | Tobita et al. | 428/323 |
| 7,291,396 B2 | 11/2007 | Huang et al. | |
| 7,354,471 B2 | 4/2008 | Hampden-Smith et al. | |
| 7,393,428 B2 | 7/2008 | Huang et al. | |
| 7,396,477 B2 | 7/2008 | Hsiao | |
| 7,438,844 B2 | 10/2008 | Huang et al. | |
| 7,648,765 B2* | 1/2010 | Takahashi et al. | 428/403 |
| 8,110,288 B2* | 2/2012 | Arai et al. | 428/403 |
| 2001/0048172 A1 | 12/2001 | Smith et al. | |
| 2002/0146562 A1* | 10/2002 | Morita et al. | 428/375 |
| 2004/0075076 A1* | 4/2004 | Bhagwagar | 252/70 |
| 2007/0249755 A1 | 10/2007 | Hiroshige et al. | |
| 2008/0295959 A1 | 12/2008 | Ishigaki et al. | |
| 2009/0250655 A1* | 10/2009 | Sano et al. | 252/76 |
| 2010/0208429 A1* | 8/2010 | Zhang et al. | 361/704 |
| 2010/0221545 A1* | 9/2010 | Abe | 428/406 |

OTHER PUBLICATIONS

Zhao, G.; Chemical Vapor Deposition Fabrication and Characterization of Silica-Coated Carbon Fiber Ultramicroelectrodes; pp. 2592-2598; Analytical Chemistry, vol. 67, No. 15, Aug. 1, 1995.
International Search Report and Written Opinion of PCT/US2010/046363; Dec. 2, 2010; 14 pages.

* cited by examiner

ADHESIVE COMPOSITIONS COMPRISING ELECTRICALLY INSULATING-COATED CARBON-BASED PARTICLES AND METHODS FOR THEIR USE AND PREPARATION

BACKGROUND

The field of this disclosure relates generally to adhesive compositions and, more particularly, to adhesive compositions that contain thermally conductive carbon-based materials that are also electrically insulated. Other aspects of the disclosure relate to methods for using such adhesive compositions and methods for their preparation.

Manufacture of electronic devices conventionally requires use of adhesive compositions. The adhesive compositions are used to attach electronic components (e.g., chips and resistors) to a target surface within the device such as a mounting surface or heat sink surface. It is desirable, in some instances, to use a thermally conductive adhesive composition (i.e., a composition that transmits heat well) so that the heat generated by the electronic component may easily pass through the adhesive to a heat sink (e.g., an aluminum or copper alloy in the device) and overheating of the device may be prevented.

Thermally conductive materials are typically also electrically conductive. As a result, when a portion of the adhesive (and particularly the filler material of the adhesive such as various metals) in conventional electronic devices dislodges due to age or repeated transport of the device (e.g., as in handheld devices or devices used in transportation), the electrically conductive components of the adhesive may contact an active region of the device and may cause the device to short-circuit. Such events may potentially cause failure of the device. Furthermore, if the composition of the adhesive is adjusted to increase its thermal conductivity (e.g., by incorporation of greater amounts of metal), the electrical conductivity of the adhesive may increase to a point at which the adhesive becomes electrically conductive causing a short-circuit of the device. Accordingly, the material is often packaged in ceramic or plastic packaging which increases the cost of the device.

A need exists for adhesive compositions that are not electrically conductive but which have a high thermal conductivity, allowing for transfer of heat from a heat generating component to a heat sink. A need also exists for processes for preparing such adhesive compositions and for using the compositions in electrical devices.

BRIEF SUMMARY

One aspect of the present disclosure is directed to an adhesive composition suitable for use as a thermal conductor for electronic components. The composition includes carbon-based particles at least partially coated with an electrically-insulating coating.

Another aspect of the present disclosure is directed to a process for producing a thermally conductive adhesive composition. The process includes depositing an electrically-insulating coating on carbon-based particles and mixing the coated carbon-based particles with a binder.

In a further aspect, a process for producing an electronic device includes applying an adhesive composition to a target surface. The adhesive composition includes a binder and carbon-based particles at least partially coated with an electrically-insulating coating dispersed throughout the binder. A component is applied to the adhesive composition to adhere the component to the target surface. The adhesive composition is then cured.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1:
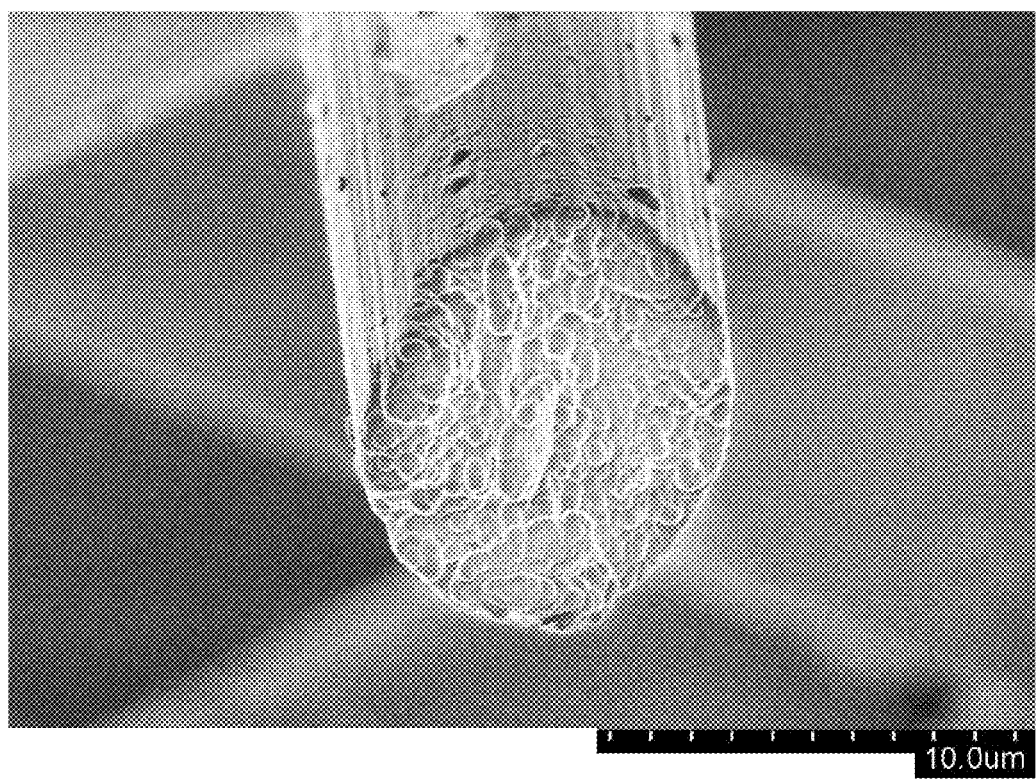
FIG. 1 is a photograph of a carbon fiber with a boron nitride coating thereon and prepared according to Example 1.

Provisions of the present disclosure include adhesive compositions suitable for use in electronic components and methods for preparing and using such compositions. Generally, the composition includes carbon-based particles that are coated with an electrically-insulating coating. Such a coating protects devices in which the particles are used from causing a possible short-circuit due to the electrical conductivity of the particles or from a portion of the adhesive (e.g., individual coated particles or groups of such particles) dislodging. The carbon-based particles may be dispersed within one or more binder materials that imparts the adhesive quality to the composition. Carbon-based materials are used due to their relatively high thermal conductivity, light weight (i.e., low density) and resistance to oxidation and melting as compared to metal materials.

As referred to herein, "carbon-based particles" refers to particles that are composed of at least about 50% by weight carbon. In other embodiments, the carbon-based particles comprise at least about 75%, at least about 90% or even at least about 95% by weight carbon. The carbon-based particles may have a thermal conductivity of at least 500 W/m*K and, in other embodiments, have a thermal conductivity of at least about 1000 W/m*K, at least about 2000 W/m*K, at least about 4500 W/m*K or even at least about 6000 W/m*K. The electrical resistance of the carbon particles may be less than about 100 ohms*cm, less than about 50 ohms*cm, less than about 30 ohms*cm, less than about 1 ohms*cm or even less than about 0.1 ohms*cm.

The source of carbon-based particles used in the adhesive may be a variety of materials including, for example, carbon fibers, graphite, exfoliated graphite, graphene and combinations thereof. In certain embodiments, the particles are carbon fibers such as, for example, ThermalGraph® DKD fibers available from Cytec Industries Inc. (Stamford, Conn.). The carbon-based particles may take a variety of shapes including platelets, fibers, spheres, flakes, tubes, rods and diamonds; however, any shape may be used without departing from the scope of the present disclosure. Generally, anisotropic materials such as, for example, fibers, rods and platelets are preferred as these materials provide high thermal conductivity at low incorporation rates (i.e., at a lower relative volume of material). Electrically-insulating carbon-based materials may be used; however, these materials are less preferred as they typically are less thermally conductive. In certain embodiments, the carbon-based material is graphitic carbon and, in other embodiments, diamonds (natural or synthetic). In some embodiments, carbon nanotubes are used in the adhesive composition.

The particle size of the carbon-based particles may vary upon the desired properties of the adhesive (adhesive power, thermal conductivity, viscosity, etc.) and may generally be determined by one of ordinary skill in the art. In some embodiments, the largest dimension of the particles is less than about 1 mm on average and may be less than about 500 µm, less than about 250 µm, less than about 100 µm or even less than about 1 µm, on average. In embodiments where fiber particles are used, the fibers may be less than about 100 nm (e.g., less than about 50 nm or from about 5 nm to 20 nm) in diameter and may be less than about 500 µm (e.g., less than about 300 µm or from about 200 µm to about 300 µm) in length on average. When carbon rods are utilized, the rods may be less than about 100 nm (e.g., less than about 50 nm or from about 5 nm to about 50 nm) in diameter and may be less than about 5 µm in length (e.g., less than about 3 µm or from about 500 nm to about 2 µm) on average. When platelets are used, the largest width of the plates may be less than about 100 µm (e.g., less than about 50 µm or from about 10 µm to about 40 µm) and the thickness of the plates may be less than about 50 nm (e.g., less than about 20 nm or from about 5 nm to about 40 nm). Generally, particle sizes other than those listed above may be used without limitation in accordance with the present disclosure.

The carbon-based particles may be coated with an electrically-insulating coating. The coating may cover a portion of each particle or the entire surface of the particle and may cover some of the particles or all of the particles without limitation. For purposes of the present disclosure, an "electrically-insulating coating" is a coating that reduces the electrical conductivity of the carbon-based particles to less than that of uncoated carbon-based particles and, stated differently, increases the electrical resistance to more than that of the uncoated carbon-based particles. Electrical resistance may be measured, for example, by the testing method described in Example 2 below. The electrical resistance of the carbon particles after coating may be at least about 50 ohms*cm and, in other embodiments, is at least about 100 ohms*cm, at least about 1000 ohms*cm, at least about $1 \times 10^5$ ohms*cm or even at least about $1 \times 10^8$ ohms*cm. The thermal conductivity of the coated particles may be at least about 50 W/m*K, at least about 300 W/m*K, at least 500 W/m*K, at least about 2000 W/m*K, at least about 4500 W/m*K or even at least about 6000 W/m*K.

Suitable coating materials include, for example, ceramics such as metal oxides, metal nitrides, metal carbides and combinations thereof. The ceramic material may be, for example, boron carbide, boron nitride, silicon carbide and silicon nitride and, in some embodiments, is boron nitride. Generally, coating materials should be chosen which do not degrade the thermal conductivity of the carbon-based particles, i.e., the coating material should not be thermally insulating.

The electrically-insulating coating may be deposited on the carbon-based particles by any known method for depositing a coating and, in certain embodiments, is deposited by chemical vapor deposition. Chemical vapor deposition (CVD) is generally known by the skilled artisan and a number of CVD techniques may be utilized such as, for example, plasma-enhanced CVD (PECVD), atmospheric-pressure CVD (APCVD), low- or reduced-pressure CVD (LPCVD), ultra-high-vacuum CVD (UHVCVD), atomic layer deposition (ALD) and aerosol assisted CVD (AACVD). The composition may be applied by techniques other than CVD including, for example, sputtering. Liquid phase methods including sol-gel processes may also be utilized without departing from the scope of the present disclosure.

Generally, CVD methods involve introduction (typically continually) of precursor compounds at elevated temperatures at or near the surface of the substrate to which the coating is to be applied. The precursor compounds react to deposit the coating on the substrate surface. The coating grows in thickness until compounds are no longer passed over the substrate at elevated temperatures. The precursor compounds chosen for use depend on the desired composition of the coating and may generally be determined by one of ordinary skill in the art. For instance, when a boron nitride coating is desired, compounds containing both boron and nitrogen may be used such as, for example, borazine ($B_3N_3H_6$). Alternatively, a first compound containing boron and a second compound containing nitrogen may be contacted with the carbon-based particles. Boron compounds include, for example, boron trichloride ($BCl_3$), diborane ($B_2H_6$) and all compounds of the generic formula $B_xH_y$. In certain embodiments, x is from 1 to 10 and y is from 1 to 15. Examples of compounds of formula $B_xH_y$ include $BH_3$, $B_2H_4$, $B_2H_6$, $B_3H_8$, $B_4H_{10}$, $B_5H_9$, $B_5H_{11}$, $B_6H_{10}$, $B_6H_{12}$, $B_8H_{12}$, $B_9H_{15}$ and $B_{10}H_{14}$. Nitrogen compounds include, for example, $N_2$, $NH_3$ and hydrazine ($N_2H_4$).

Similarly when silicon nitride coatings are desired, a boron compound and a nitrogen compound may be used as precursor compounds. Suitable silicon compounds include, for example, silicon tetrachloride, silane and halosilanes (e.g., trichlorosilane).

The entire surface (or the entire surface exposed to the precursor compounds) of the carbon-based particles may be coated or alternatively only a portion may be coated. Generally, it is desirable to coat as much of the particles as possible to ensure that the particles contain sufficient electrical-insulation. The thickness of the coating may be varied to ensure adequate electrical resistance of the adhesive composition and to ensure thermal conductivity is not degraded below desired levels. Generally, the electrically-insulating coating may be at least about 10 nm in thickness and, in other embodiments, may be at least about 100 nm, at least about 500 nm, at least about 1 µm, at least about 10 µm or at least about 100 µm. In some embodiments, the thickness of the coating is from about 10 nm to about 10 µm or from about 100 nm to about 1 µm.

The electrically-insulating coating may be applied at a variety of temperatures and pressures depending on the deposition technique, the material to be deposited, the carbon-based particles used as the substrate, the desired coating thickness and the like. In various embodiments, the coating is applied at a temperature of from about 450° C. to about 1000° C., preferably from about 500° C. to about 900° C. or even more preferably from about 600° C. to about 800° C.

In some embodiments, the coating is applied at reduced pressures such as, for example, less than about atmospheric, less than about $10^4$ Pa, less than about 250 Pa, less than about 1 Pa, less than about $10^{-3}$ Pa or even less than about $10^{-6}$ Pa. The coating may be applied at atmospheric pressures or even at pressure above atmospheric such as at least about $2 \times 10^5$ Pa.

The adhesive composition may include a binder. Generally, the binder acts to add structural integrity to the adhesive and provides the adhesive force to attach surfaces and/or components. Generally, any adhesive material may be used and, in certain embodiments, the binder is selected from epoxies, polyurethanes, acrylics and combinations thereof. One suitable adhesive is DIS-A-PASTE 2310 available from Aptek Laboratories, Inc. (Valencia, Calif.).

The adhesive composition may be prepared by adding the electrically-insulated coated fiber-based particles to the binder and mixing. In certain embodiments, high-shear mixing should be used to thoroughly mix the composition. One or more additives may be added and mixed before or after addition of the fiber-based particles. Suitable additives include wetting compounds, surfactants, antifungal compounds, UV protectant compounds, defoaming compounds and catalysts. Generally, the adhesive composition is in the form of a paste or highly viscous liquid after mixing and prior to curing.

The adhesive composition may include at least about 10% coated carbon-based particles by weight with the remainder of the composition being binder or additives. In other embodiments, the composition comprises at least about 25%, at least about 50%, at least about 75% or even at least about 95% coated carbon-based particles. Generally, the percent inclusion of components of the adhesive composition described herein are listed as the percent inclusion by weight of the total composition unless stated otherwise.

The coated carbon-based particles may be mixed into the binder with uncoated particles to minimize cost. Use of uncoated particles may elevate electrical conductivity with the rise in conductivity being proportional to the amount of incorporation of uncoated particles. Generally, however, the uncoated carbon-based particles should not be included in an amount above that which corresponds to a targeted or desired threshold electrical conductivity. The adhesive composition may comprise at least about 25% carbon-based particles coated according to the present disclosure and, in other embodiments, comprises at least about 50%, at least about 75%, at least about 90%, at least about 95%, or even at least about 99% carbon particles with an electrically-insulated coating by weight. In some embodiments, only coated carbon-based particles are used in the adhesive composition.

Once the adhesive composition is prepared, it may be applied to a target surface and a component or other surface may be contacted with the adhesive. Upon curing, the component is attached to the surface. Generally, curing times may be at least about 5 seconds, at least about 30 seconds, at least about 1 minute, at least about 5 minutes, at least about 30 minutes, at least about 1 hour, at least about 5 hours or even longer depending on the binder.

In certain embodiments, a second binder material is added to the mixture to cause the adhesive composition to begin to cure. For example, the coated carbon-based particles may be mixed with a first binder to produce a paste composition and immediately prior to use a second binder may be added to the mixture to cause the binders to react and for the mixture to begin to cure.

The adhesive composition may be used in electronic devices and may replace conventionally used adhesives. The adhesive composition may be used to attach an electronic component (e.g., integrated circuits, chips, resistors, thermal chip strap and the like) to a substrate (e.g., dielectric layer) or to attach various layers in the device (e.g., as in multi-layer PCB's. The adhesive may be used in applications where a heat transfer pathway is desirable such as between an electronic component and a heat sink for that component. The adhesive composition may be used in electronic devices used in the airline or satellite industries due to their characteristic light weight, high durability and short-circuit protection. While the adhesive compositions of the present disclosure have been generally described in use with electrical devices, other uses are contemplated and within the scope of the present disclosure.

EXAMPLES

Example 1

Preparation of Electrically-Insulated Carbon Fibers

A quartz tube was filled with carbon fibers (Thermal-Graph® DKD, Cytec Industries Inc. (Stamford, Conn.)) (0.50 g) and placed in an aluminum oxide boat. The tube and boat were placed in a tube furnace. An argon gas line was connected to one end of the quartz tube. The argon line was connected to a borazine bubbler (and bubbler by-pass) to add borazine to the gas stream prior to addition to the quartz tube. The other end of the quartz tube exhausted into an oil bubbler and a fume hood.

Figure 2:
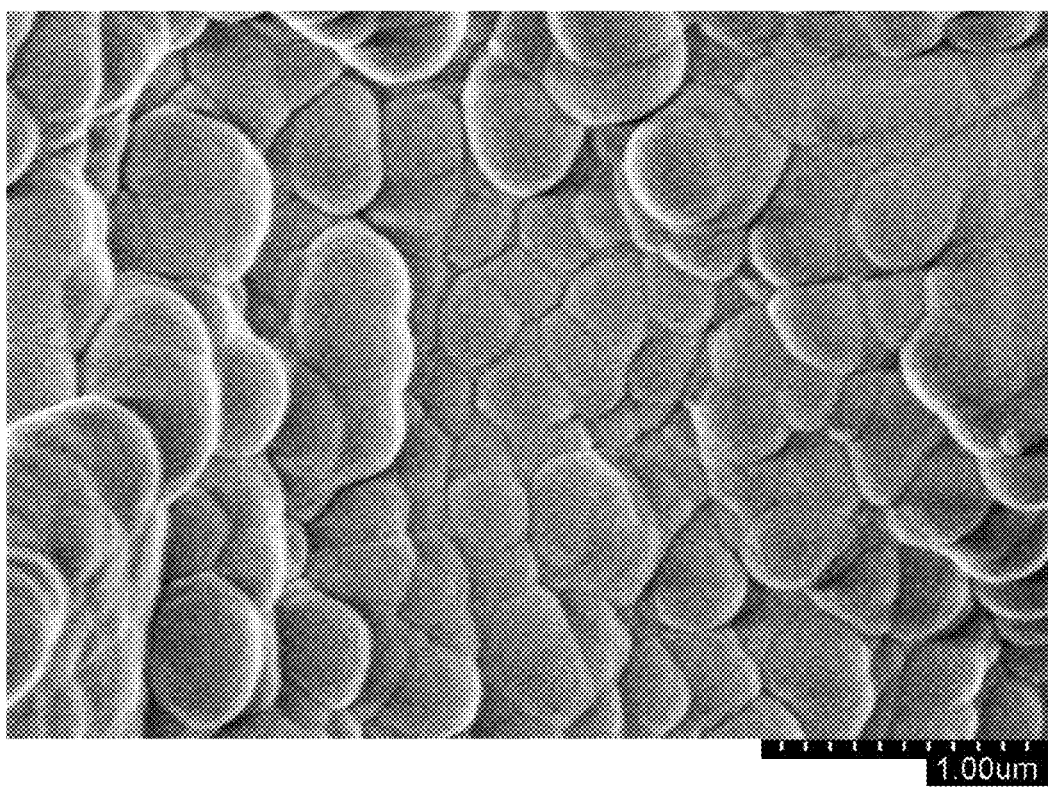
FIG. 2 is a photograph of the end of the carbon fiber of FIG. 1.
Figure 3:
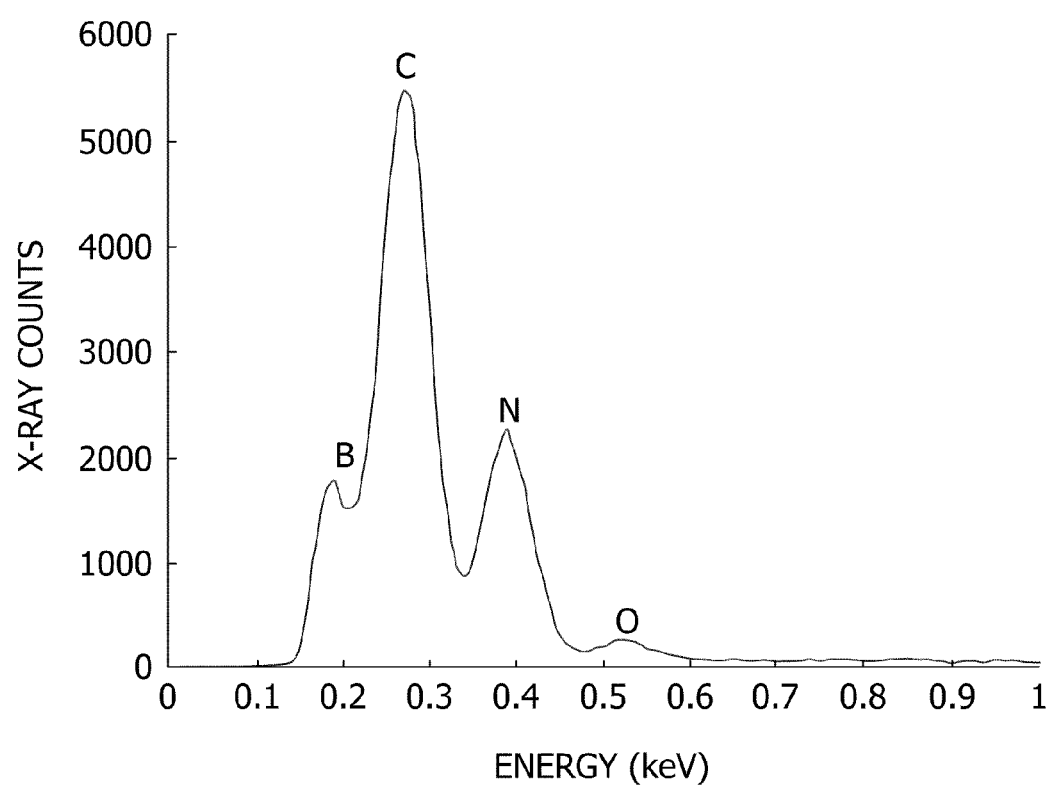
FIG. 3 is a graphical depiction of the EDAX analysis of a coated carbon fiber prepared according to Example 1.

The quartz tube was evacuated and backfilled with argon gas three times. Argon (100 ml/min) was flowed through the tube through the carbon fiber. The furnace temperature was raised to 700° C. and argon gas bubbled through the borazine bubbler (100 ml/min) was fed through the tube for 15 minutes. After the minutes, the bubbler was bypassed and the tube furnace was allowed to cool to room temperature. As can be seen from FIG. 1, the carbon fibers were coated with boron nitride. The end of the carbon fiber is shown in FIG. 2. The boron nitride coating is shown be the darker cells (i.e., crystallites of boron nitride) to the right of the Figure. The coating forms a continuous layer on the carbon fiber. The boron nitride either displaced the surface carbon atoms or coated the surface carbon atoms. The coated carbon fibers were analyzed by energy dispersive spectroscopy (EDAX) and the results are shown in FIG. 3. As can be seen from FIG. 3, the coated fiber contained boron, nitrogen and carbon which is further evidence that the fiber was coated with boron nitride. Borazine is known to decompose into boron nitride. The small amount of oxygen observed may have been introduced from the aluminum tube or from a small amount of material being oxidized.

Example 2

Determination of the Electrical-Insulating Quality of the Coated Carbon Fibers

The coated carbon fibers of Example 1 (20 mg) were pressed into 7 mm pellets in a FTIR pellet press. Uncoated carbon fibers (20 mg) were also pressed into 7 mm pellets. The pellets were mounted on transparent plastic tape and the conductivity of each pellet was tested using a four-point probe. Untreated carbon pellets had an electrical resistance of 285 ohm and the coated pellets of Example 1 had a substantially higher electrical resistance of $1.75 \times 10^6$ ohm.

Example 3

Determination of the Effect of Increasing the Coating Deposition Temperature

Figure 4:
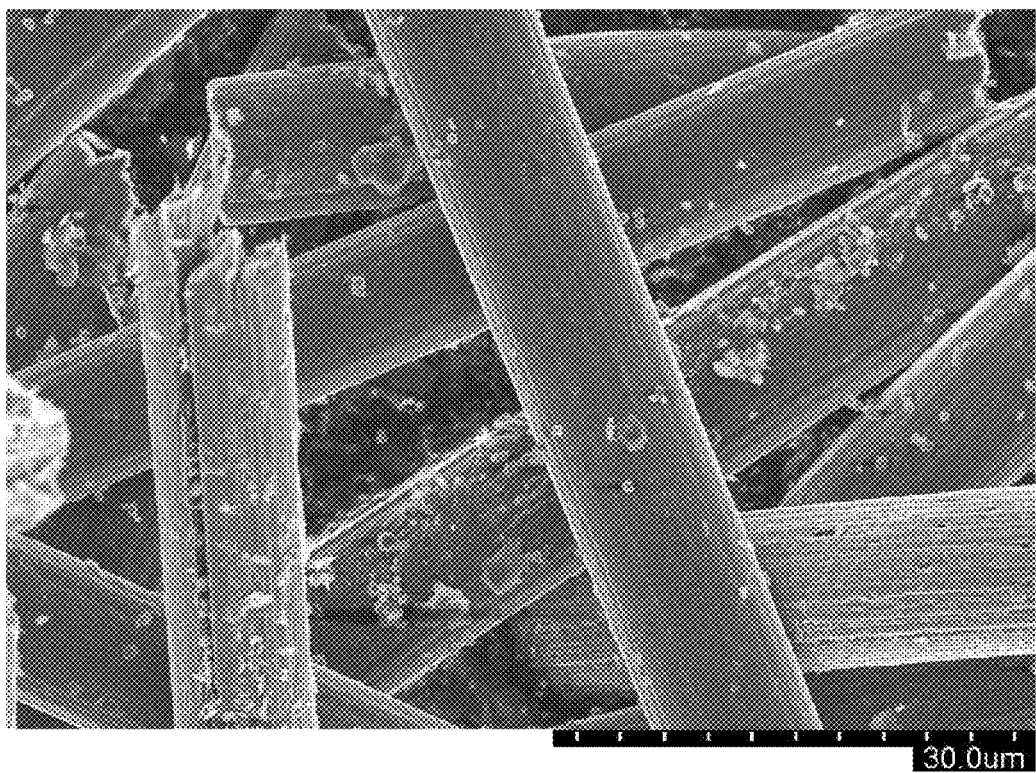
FIG. 4 is a photograph of a carbon fiber with boron nitride crystals thereon and prepared according to Example 3.

Example 1 was repeated but the furnace was heated to 1000° C. rather than 700° C. As can be seen from FIG. 4, crystals formed on the surface of the fibers. The crystals formed a non-uniform coating on the fibers. EDAX analysis confirmed that the crystals were composed of boron and nitrogen and that exposed portions of the fiber was carbon.

Example 4

Preparation and Electrical Resistance Testing of an Adhesive Containing 5% by Weight Electrically-Insulated Carbon Fibers The electrically-insulated carbon fibers of Example 1 were made into a thermally conductive adhesive with an epoxy base. Thirty-minute Delayed Set Epoxy (part number SY-SS; Super Glue Corporation (Rancho Cucamonga, Calif.)) was used as the base. The epoxy is a two part formulation containing a resin and a hardener. The resin (0.982 g) and the coated carbon fibers (0.103 g) of Example 1 were mixed together by hand with a spatula. Hardener (0.984 g) was mixed into the resin and carbon fiber suspension with a spatula until a smooth black liquid was obtained. This mixture resulted in a 5% by weight filler adhesive formulation which is typical for carbon filled thermally conductive adhesives. The filled adhesive was applied on a glass slide as a film using a 0.040 inch (1 mm) gap draw down bar and was allowed to cure for 48 hours. The cured film was black, appeared uniform, and was 0.034 inches (0.86 mm) high. The electrical resistance was measured with a four point probe station and found to be equivalent to an open circuit (the maximum resistance the meter can measure is 1 G ohms, thus the electrical resistance of the epoxy is at least $10^9$ ohm*cm) which demonstrates that the adhesive was electrically-insulating.

Example 5

Preparation and Electrical Resistance Testing of an Adhesive Containing 10% by Weight Electrically-Insulated Carbon Fibers An adhesive was prepared and tested according to the method of Example 4 with different amounts of resin (0.271 g), coated carbon fibers (0.060 g) and hardener (0.276 g). The mixture resulted in a 10% by weight filler adhesive formulation which is also typical for carbon filled thermally conductive adhesives. The cured film was black, appeared uniform, and was 0.031 inches (0.79 mm) high. The electrical resistance was also found to be an open circuit with the electrical resistance of the adhesive being at least $10^9$ ohm*cm.

Example 6

Preparation and Electrical Resistance Testing of an Adhesive Containing 10% by Weight Non-Insulated Carbon Fibers Untreated carbon fibers (ThermalGraph® DKD, Cytec Industries Inc. (Stamford, Conn.)) were incorporated into an adhesive and tested according to the method of Example 4. The adhesive contained resin (0.620 g), uncoated carbon fibers (0.137 g) and hardener (0.616 g) to make an adhesive containing 10% by weight uncoated carbon fibers. The cured film was black, appeared uniform, and was 0.025 inches (0.64 mm) high. The electrical resistance was measured to be $17 \times 10^6$ ohms*cm which is significantly lower than the adhesive containing coated carbon fibers.

Example 7

Preparation of Electrically-Insulated Carbon Fibers in the Presence of a Plasma A quartz tube was filled with carbon fibers (Thermal-Graph® DKD, Cytec Industries Inc. (Stamford, Conn.)) (0.50 g) and placed in an aluminum oxide boat. The tube and boat were placed in a tube furnace. An argon gas line in a fitting with an electrical connection was connected to one end of the quartz tube. Two steel wires extended from the electrical bypass into the tube furnace inside a ceramic jacket. The tips of the wire were exposed at the end of the ceramic jacket and used to strike a plasma. The wires were connected to a 1500V, 0.5 A power supply. The argon line was connected to a borazine bubbler (and bubbler by-pass) to add borazine to the gas stream prior to addition to the quartz tube. The other end of the quartz tube exhausted into an oil bubbler and a fume hood.

The quartz tube was evacuated and backfilled with argon gas three times. Argon (100 ml/min) was flowed through the tube through the carbon fiber. The furnace temperature was raised to 700° C. and 1500 V was applied to the wires until a plasma was generated. Then argon gas was bubbled through the borazine bubbler (100 ml/min) and was fed through the tube for 15 minutes. After the minutes, the bubbler was bypassed and the tube furnace was allowed to cool to room temperature. The carbon fibers came out of the furnace with a white-yellow coating that was identified as boron nitride using EDAX in a scanning electron microscope (SEM).

This written description uses examples to disclose various embodiments, which include the best mode, to enable any person skilled in the art to practice those embodiments, including making and using any compositions, devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. As various changes could be made in the above compositions and methods without departing from the scope of the disclosure, it is intended that all matter contained in the above description and shown in the accompanying figures shall be interpreted as illustrative and not in a limiting sense.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. An adhesive composition suitable for use as a thermal conductor for electronic components, the composition comprising a first plurality of carbon-based particles and a second plurality of carbon-based particles, the first plurality of carbon-based particles having an electrically-insulating coating having a thickness of at least about 10 nanometers extending over the carbon-based particles of the first plurality such that a continuous coating of electrically-insulating material is formed, and the second plurality of carbon-based particles uncoated with the electrically-insulating coating, wherein a ratio of the first and second pluralities of carbon-based particles in the adhesive composition is selected to ensure an electrical conductivity of the adhesive composition is less than a predetermined threshold, the first plurality of carbon-based particles of the adhesive composition having an electrical resistance of at least 50 ohms*cm and comprising at least about 10 percent of the adhesive composition by weight.

2. An adhesive composition as set forth in claim 1 wherein the carbon-based particles are in a shape selected from platelets, fibers, spheres, flakes, tubes, rods, diamonds and combinations thereof.

3. An adhesive composition as set forth in claim 1 wherein the carbon-based particles comprise carbon fiber.

4. An adhesive composition as set forth in claim 1 wherein the carbon-based particles comprise graphitic carbon.

5. An adhesive composition as set forth in claim 4 wherein the graphitic carbon is a material selected from carbon fibers, graphite, exfoliated graphite, graphene and combinations thereof.

6. An adhesive composition as set forth in claim 1 wherein the adhesive composition is a paste.

7. An adhesive composition as set forth in claim 1 wherein the electrically-insulating coating is selected from ceramics and diamond-like carbon.

8. An adhesive composition as set forth in claim 1 wherein the electrically-insulating coating is a ceramic selected from the group consisting of metal oxides, metal nitrides, metal carbides and combinations thereof.

9. An adhesive composition as set forth in claim 1 wherein the electrically-insulating coating is a ceramic selected from boron carbide, boron nitride, silicon carbide and silicon nitride.

10. An adhesive composition as set forth in claim 1 wherein the carbon-based particles are entirely coated with the electrically-insulating coating.

11. An adhesive composition as set forth in claim 1 further comprising a binder.

12. An adhesive composition as set forth in claim 11 wherein the binder is selected from epoxies, polyurethanes, acrylics and combinations thereof.

* * * * *